(12) United States Patent
Wang et al.

(10) Patent No.: US 10,589,429 B2
(45) Date of Patent: Mar. 17, 2020

(54) MACHINE SYSTEM

(71) Applicant: Fanuc Corporation, Yamanashi (JP)

(72) Inventors: Kaimeng Wang, Yamanashi (JP);
Nobuaki Yamaoka, Yamanashi (JP);
Hajime Suzuki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/880,844

(22) Filed: Jan. 26, 2018

(65) Prior Publication Data

US 2018/0257239 A1    Sep. 13, 2018

(30) Foreign Application Priority Data

Mar. 8, 2017  (JP) ................................. 2017-043989

(51) Int. Cl.
*B25J 13/00*  (2006.01)
*B25J 9/16*  (2006.01)
(Continued)

(52) U.S. Cl.
CPC ........... *B25J 13/006* (2013.01); *B25J 9/1641* (2013.01); *B25J 9/1694* (2013.01); *B25J 13/088* (2013.01); *H04L 1/08* (2013.01); *Y10S 901/09* (2013.01)

(58) Field of Classification Search
CPC ...... B25J 9/1641; B25J 9/1694; B25J 13/006; B25J 13/088; Y10S 901/09; G05B 2219/39413; H04L 1/08
See application file for complete search history.

(56) References Cited

U.S. PATENT DOCUMENTS

2006/0173571 A1    8/2006  Hosokawa et al.
2006/0173573 A1    8/2006  Hosokawa et al.
(Continued)

FOREIGN PATENT DOCUMENTS

CN    104476549 A    4/2015
CN    106003023 A    10/2016
(Continued)

OTHER PUBLICATIONS

Japan Patent Office, Decision to Grant a Patent dated Oct. 2, 2018 for Japan Patent Application No. 2017-043989.
(Continued)

*Primary Examiner* — Robert T Nguyen
(74) *Attorney, Agent, or Firm* — Winstead PC

(57) ABSTRACT

Provided is a machine system including a machine including a movable part; a control device; a sensor detecting information about the movable part during a predetermined operation of the machine; a transmitting unit wirelessly transmitting the detected information during the predetermined operation; a receiving unit receiving the wirelessly transmitted information; a storage unit storing the received information; a detection unit detecting a loss in the received information; a command unit causing the machine to repeat the predetermined operation, in a case where a loss in the information is detected; a determination unit determining whether or not every lost part of the information detected first is contained in the information detected during the repeated operation; and an complementing unit ending the repeated operation in a case where every lost part is determined to be contained and complementing the information detected first with the information detected during the repeated operation.

9 Claims, 5 Drawing Sheets

(51) Int. Cl.
*H04L 1/08* (2006.01)
*B25J 13/08* (2006.01)

(56) References Cited

U.S. PATENT DOCUMENTS

| | | | |
|---|---|---|---|
| 2009/0030550 | A1 | 1/2009 | Nagata et al. |
| 2010/0094462 | A1 | 4/2010 | Sugihara et al. |
| 2010/0121489 | A1 | 5/2010 | Inazumi et al. |
| 2011/0208356 | A1 | 8/2011 | Kato et al. |
| 2012/0296471 | A1* | 11/2012 | Inaba ............... B25J 9/163 700/253 |
| 2014/0114476 | A1 | 4/2014 | Maeda |
| 2015/0183114 | A1* | 7/2015 | Takahashi ......... B25J 9/1692 700/253 |
| 2015/0246442 | A1 | 9/2015 | Cho et al. |
| 2016/0271794 | A1 | 9/2016 | Inaba |

FOREIGN PATENT DOCUMENTS

| | | |
|---|---|---|
| DE | 112006000695 T5 | 2/2008 |
| DE | 102016003051 A1 | 9/2016 |
| EP | 1479964 A2 | 11/2004 |
| EP | 1688806 A1 | 8/2006 |
| EP | 1688808 A2 | 8/2006 |
| EP | 1716983 B1 | 5/2008 |
| EP | 1817141 B1 | 6/2010 |
| EP | 2684651 A2 | 1/2014 |
| JP | H11-051374 A | 2/1999 |
| JP | H11-231892 A | 8/1999 |
| JP | 2006-215732 A | 8/2006 |
| JP | 2006-215740 A | 8/2006 |
| JP | 2007-038326 A | 2/2007 |
| JP | 2011-161562 A | 8/2011 |
| JP | 2011-167817 A | 9/2011 |
| JP | 2011-183498 A | 9/2011 |
| JP | 2012-19345 A | 1/2012 |
| JP | 2014-048953 A | 3/2014 |
| JP | 2015-123538 A | 7/2015 |
| JP | 2015-163416 A | 9/2015 |
| JP | 2016-066216 A | 4/2016 |

OTHER PUBLICATIONS

Japan Patent Office, Search Report dated Sep. 7, 2018 for Japan Patent Application No. 2017-043989.
State Intellectual Property Office of Peoples's Republic of China, Office Action dated Jan. 3, 2019 for Patent Application No. 201810173162.3.

* cited by examiner

MACHINE SYSTEM

CROSS-REFERENCE TO RELATED APPLICATIONS

This application claims the benefit of Japanese Patent Application No. 2017-043989, the content of which is incorporated herein by reference.

TECHNICAL FIELD

The present invention relates to a machine system.

BACKGROUND ART

Conventionally, there is known a robot system which includes a wireless acceleration sensor attached to a tip of a robot, and which wirelessly transmits vibration during robot operation while measuring the vibration by the acceleration sensor, and reduces the vibration by receiving transmitted acceleration information by a control device and performing learning control (for example, see Patent Literature 1).

CITATION LIST

Patent Literature

{PTL 1}
Japanese Unexamined Patent Application, Publication No. 2015-123538

SUMMARY OF INVENTION

An aspect of the present invention provides a machine system including a machine including a movable part, a control device that controls the machine, a sensor that is attached to the movable part, and that detects information about the movable part during a predetermined operation of the machine by the control device, a transmitting unit that is attached to the movable part, and that is wirelessly transmits, during the predetermined operation, the information detected by the sensor, a receiving unit that is disposed at a position separate from the machine, and that receives the information wirelessly transmitted by the transmitting unit, a storage unit that stores the information received by the receiving unit, a loss detection unit that detects a partial loss in the information received by the receiving unit, an iterative operation command unit that causes, by the control device, the machine to repeat the predetermined operation at least once, in a case where a loss in the information is detected by the loss detection unit, a complementing information determination unit that determines whether or not every lost part of the information detected first is contained in the information detected by the sensor during at least one repeated operation caused by the iterative operation command unit, and an information complementing unit that ends the repeated operation in a case where every lost part is determined by the complementing information determination unit to be contained, and that complements the information detected first with the information detected during the at least one repeated operation.

DESCRIPTION OF EMBODIMENTS

A machine system 1 according to an embodiment of the present invention will be described below with reference to the drawings.

Figure 1:
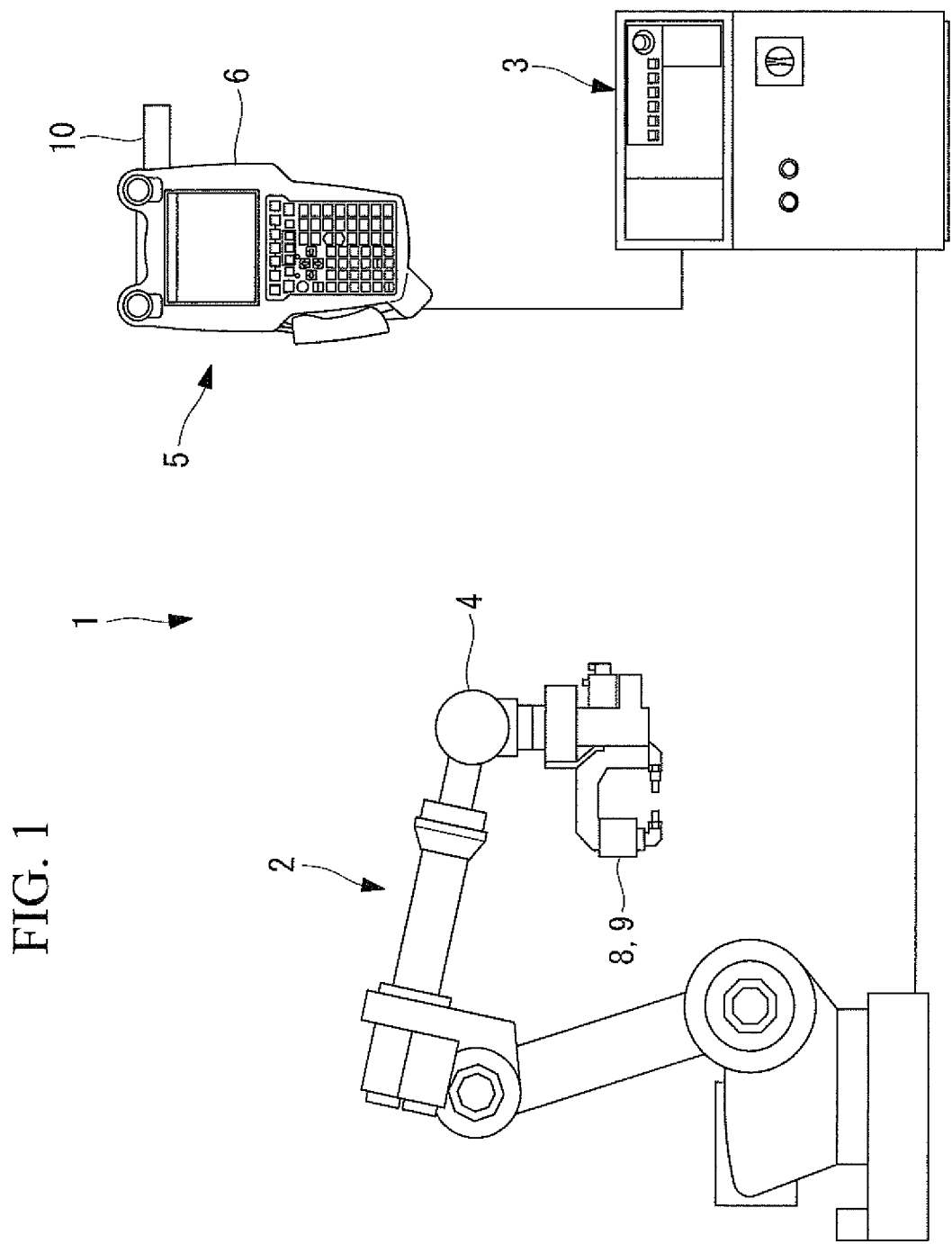
FIG. 1 is an overall configuration diagram showing a machine system according to an embodiment of the present invention.

As shown in FIG. 1, the machine system 1 according to the present embodiment includes a robot (machine) 2, a control device 3 for controlling the robot 2, and an information detection system 5 for detecting vibration (information) of a welding gun (movable part) 4 provided at a wrist of the robot 2.

The robot 2 may be of any type, but in the example shown in FIG. 1, the robot 2 is a vertical articulated robot.

The control device 3 is installed at a position separate from the robot 2 while being connected to the robot 2 by a wire. A portable teach pendant 6 is connected to the control device 3 by wired or wireless communications.

Figure 2:
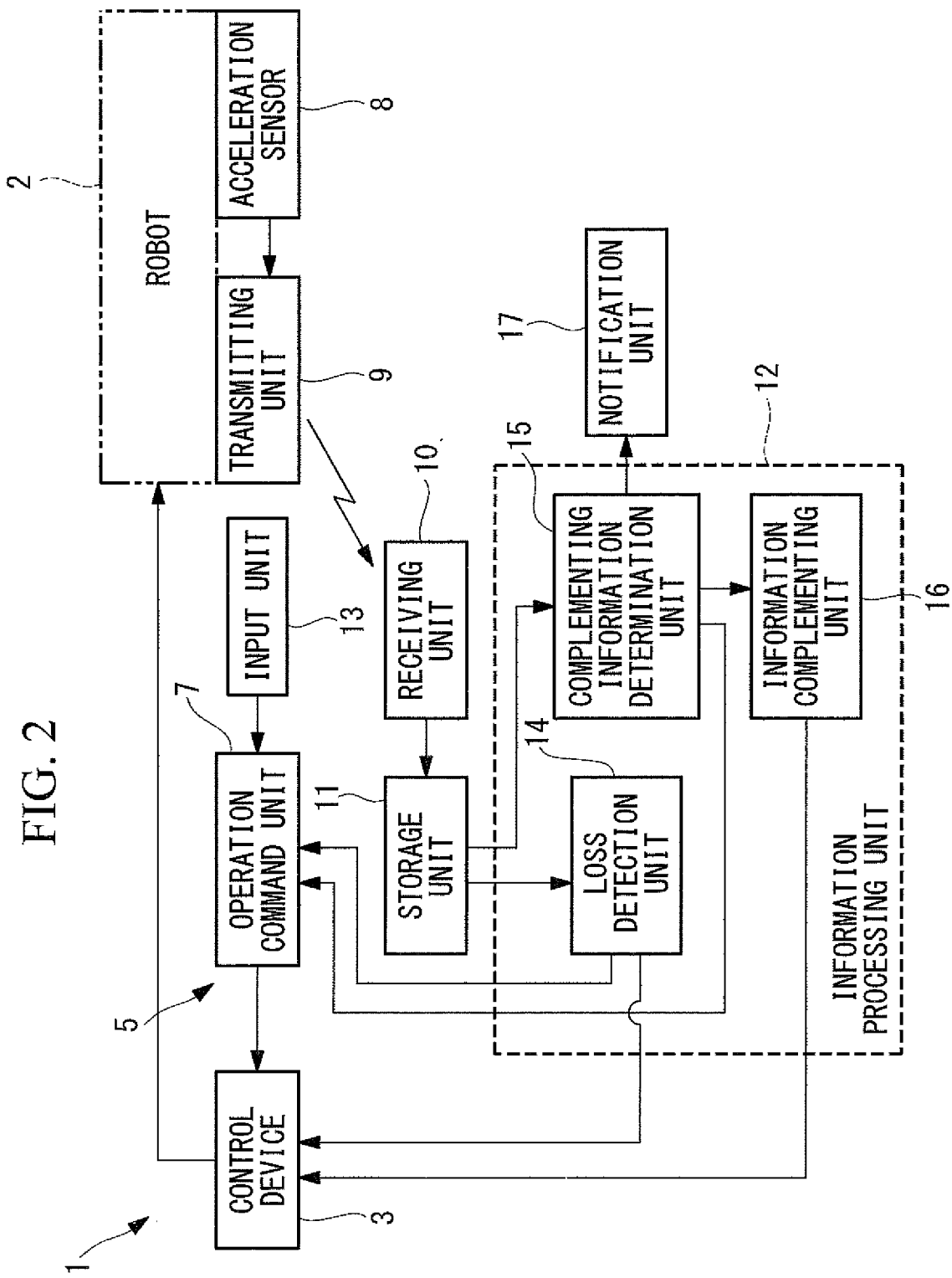
FIG. 2 is a block diagram showing an information detection system in the machine system in FIG. 1.

As shown in FIGS. 1 and 2, the information detection system 5 includes an operation command unit (iterative operation command unit) 7, provided at the teach pendant 6, for commanding the control device 3 to cause the robot 2 to perform a predetermined operation, an acceleration sensor (sensor) 8, attached to the welding gun 4 mounted at a tip of the wrist of the robot 2, for detecting acceleration information of the welding gun 4 during the predetermined operation of the robot 2, and a transmitting unit 9, likewise provided at the welding gun 4, for wirelessly transmitting the acceleration information detected by the acceleration sensor 8.

Furthermore, the information detection system 5 includes a receiving unit 10, provided at the teach pendant 6, for receiving the acceleration information wirelessly transmitted by the transmitting unit 9, a storage unit 11 for storing the acceleration information received by the receiving unit 10, and an information processing unit 12 for processing the received acceleration information. A reference sign "13" is an input unit used by a user to perform input.

The information processing unit 12 includes a loss detection unit 14 for detecting whether the received acceleration information is partially lost or not. In the case where presence of a lost part is detected by the loss detection unit 14, a notification to the effect is transmitted to the operation command unit 7. When notified of the presence of a lost part, the operation command unit 7 commands the control device 3 to cause the robot 2 to repeat the same operation as the first predetermined operation at least once.

Furthermore, the information processing unit 12 includes a complementing information determination unit 15 for determining whether acceleration information re-detected by the acceleration sensor 8 during the at least one repeated operation contains all the lost parts of the acceleration information which was detected first, and an information complementing unit 16 for ending the repeated operation in a case where all the lost parts are determined by the complementing information determination unit 15 to be contained, and for supplementing the lost parts of the acceleration information which was detected first by the acceleration information detected during the at least one repeated operation performed.

A reference sign "17" in the drawing is a notification unit for issuing an alarm when the count of repeated operation exceeds a predetermined count.

The operation of the machine system 1 according to the present embodiment configured in the above manner will be described below.

Figure 3:
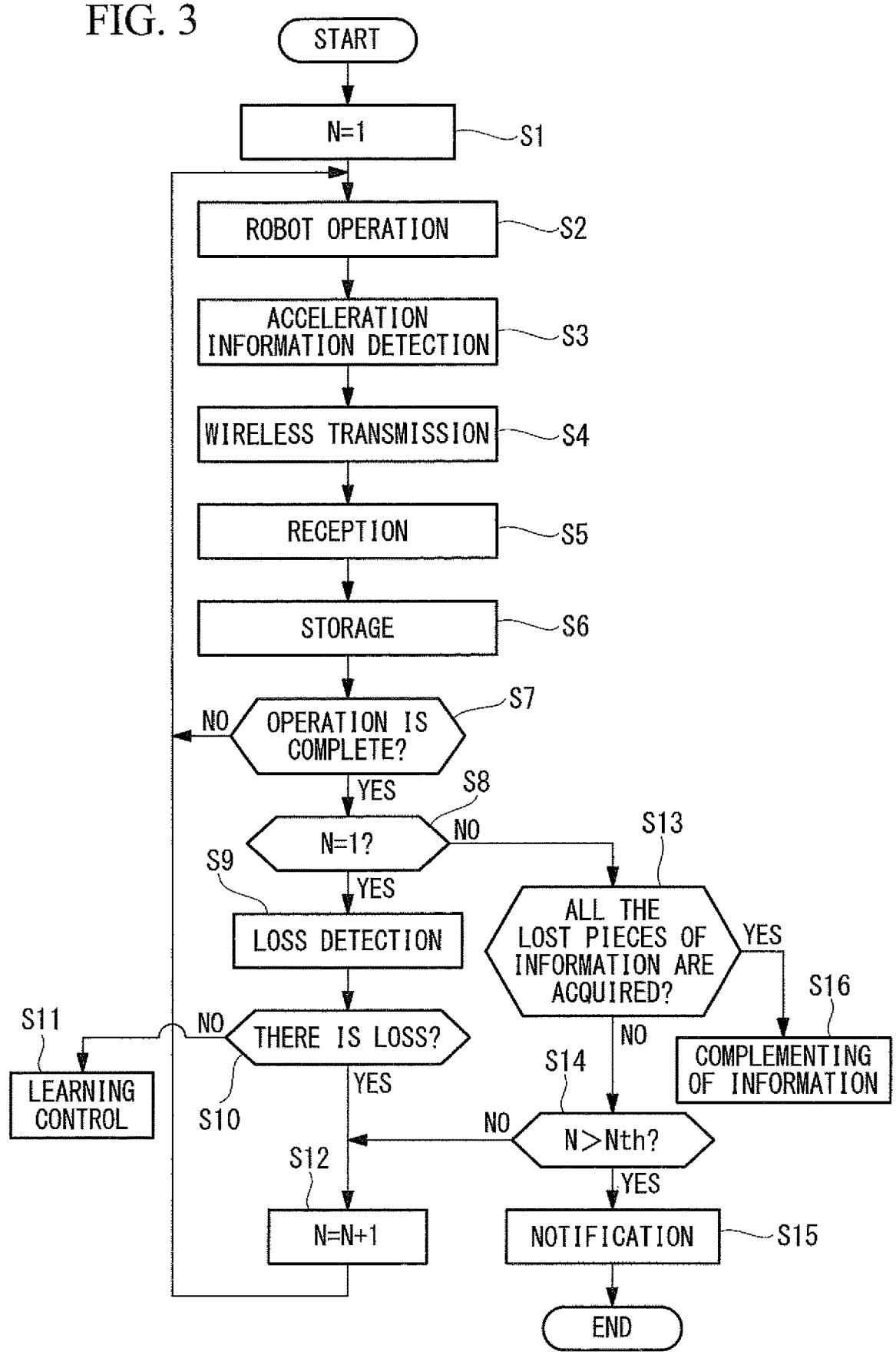
FIG. 3 is a flowchart describing an operation of the machine system in FIG. 1.

As shown in FIG. 3, to acquire, by using the machine system 1 according to the present embodiment, acceleration information of the welding gun 4, which is attached at the tip of the wrist of the robot 2, generated during a predetermined operation of the robot 2, a count N is initialized by a user performing input using the input unit 13 (step S1), and the control device 3 controls the robot 2 according to an operation program stored in advance, based on an operation command issued by the operation command unit 7 of the information detection system 5, so as to cause the robot 2 to perform a predetermined operation (step S2).

Furthermore, the information detection system 5 detects, by the acceleration sensor 8 attached to the welding gun 4, acceleration information during the predetermined operation of the robot 2 (step S3), and wirelessly transmits, by the transmitting unit 9, the detected acceleration information at a predetermined transmission timing during the operation of the robot 2 (step S4). The wirelessly transmitted acceleration information is received by the receiving unit 10 provided at the teach pendant 6 disposed at a position separate from the robot 2 (step S5), and is stored in the storage unit 11 (step S6). Whether the entire operation is completed or not is determined (step S7), and if not completed, the steps are repeated from step S2.

When the first predetermined operation is completed, whether the count N is "1" or not is determined (step S8), and in the case of "1", detection of a lost part of the received acceleration information is performed by the loss detection unit 14 (step S9), and whether there is a lost part or not is determined (step S10).

In the case where no lost part is detected by the loss detection unit 14, learning control by the control device 3 is performed by using the acceleration information stored in the storage unit 11 (step S11). The robot 2 may thereby be caused to operate in a manner suppressing vibration at the welding gun 4 attached to the tip of the wrist of the robot 2.

In the case where a lost part is detected by the loss detection unit 14, the count N is incremented (step S12), information indicating that a loss is detected is input to the operation command unit 7, and the operation command unit 7 causes the control device 3 to again cause the robot 2 to perform the predetermined operation from step S2. The robot 2 thus repeats the same operation as the predetermined operation which was performed first (step S2), and the acceleration information is detected by the acceleration sensor 8 also during this repeated operation (step S3), is wirelessly transmitted by the transmitting unit 9 (step S4), is received by the receiving unit 10 (step S5), and is stored in the storage unit 11 (step S6).

Then, when the repeated operation is completed (step S7), whether or not the acceleration information re-detected by the acceleration sensor 8 during the repeated operation contains the acceleration information at all the lost parts of the acceleration information which was detected first is determined by the complementing information determination unit 15 (step S13). In the case where the acceleration information at all the lost parts are not contained, whether or not the count N is greater than a predetermined count Nth is determined (step S14), and in the case where the count N is equal to or smaller than the count Nth, step S12 is performed again, and the repeated operation is performed again. In the case where the count N is greater than the count Nth, an alarm is issued by the notification unit 17 (step S15), and operation of the robot 2 is ended.

Then, in the case where the complementing information determination unit 15 determines in step S13 that pieces of acceleration information at all the lost parts of the first acceleration information are contained in all the pieces of acceleration information re-detected by the acceleration sensor 8 during the at least one repeated operation, an interpolation process is performed by the information complementing unit 16 (step S16).

The interpolation process by the information complementing unit 16 will now be described.

Figure 4:
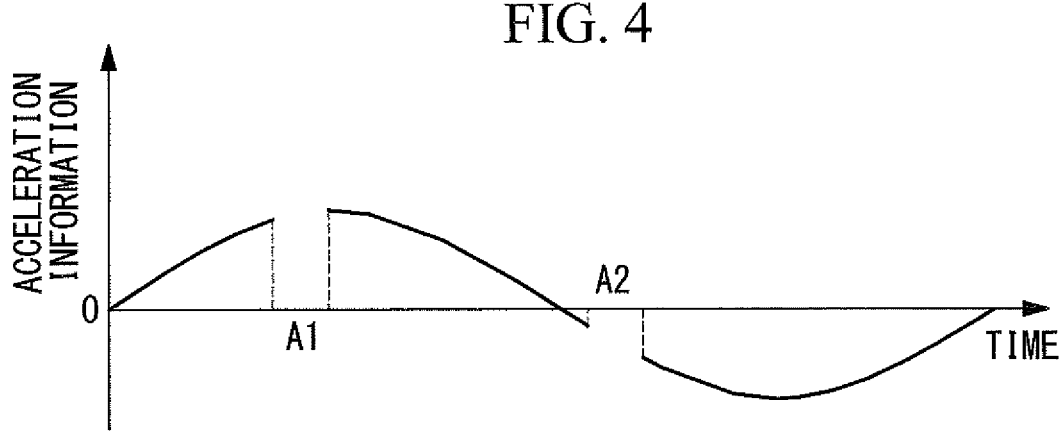
FIG. 4 is a diagram showing an example of acceleration information which is acquired during a first predetermined operation by the machine system in FIG. 1.

When acceleration information shown in FIG. 4 is acquired during the first predetermined operation, partial losses are detected by the loss detection unit 14, and the predetermined operation of the robot 2 is repeated. Then, acceleration information shown in FIG. 5 is acquired during the repeated operation.

Figure 5:
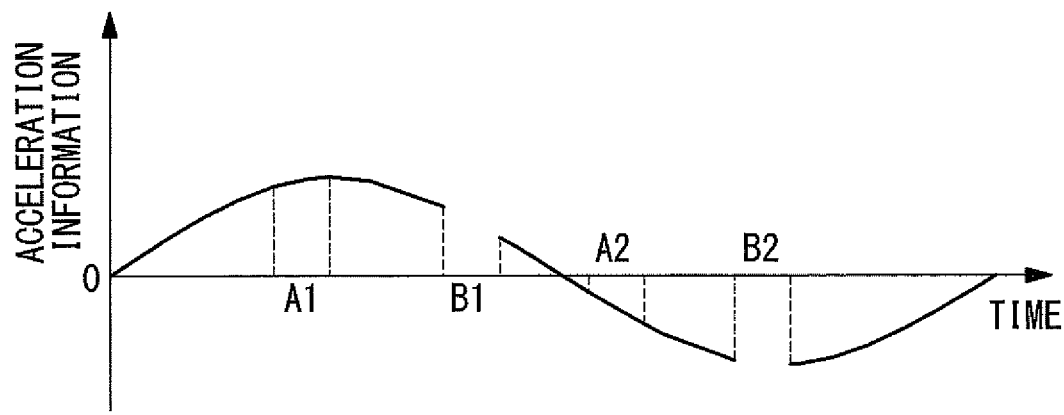
FIG. 5 is a diagram showing an example of acceleration information which is acquired during a repeated operation by the machine system in FIG. 1.

In the example shown in FIG. 4, the acceleration information detected during the first operation includes lost parts at timings A1, A2, but as shown in FIG. 5, the acceleration information detected during the repeated operation is lost at timings B1, B2 different from, and not overlapping, the timings A1, A2 of the lost parts along a time axis direction. Accordingly, the complementing information determination unit 15 determines that the acceleration information at all the lost parts of the first acceleration information is contained in the acceleration information of the repeated operation, and the interpolation process by the information complementing unit 16 is performed without any further repeated operation.

Figure 6:
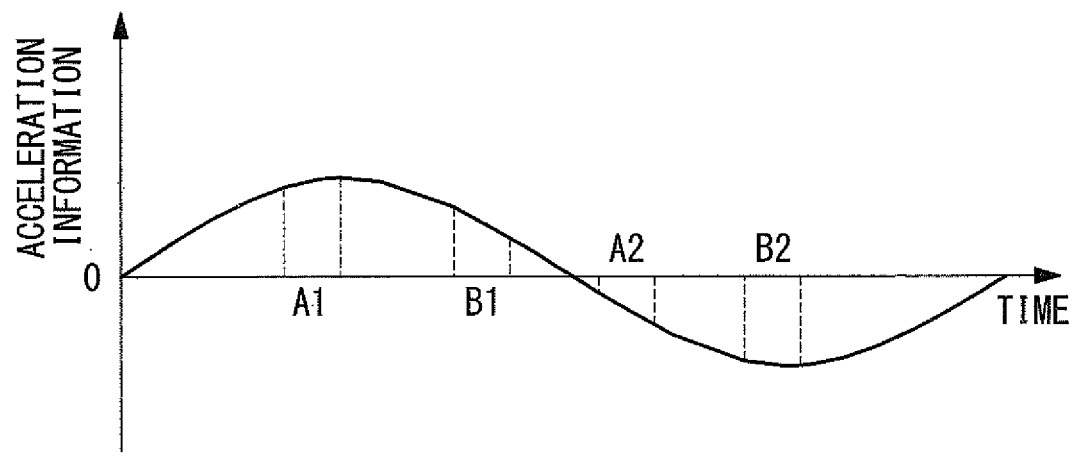
FIG. 6 is a diagram showing acceleration information which is obtained by complementing the acceleration information in FIG. 4 with the acceleration information in FIG. 5.

That is, pieces of the first acceleration information at the timings A1, A2 of the lost parts are complemented by the information complementing unit 16 with the pieces of acceleration information at the timings A1, A2 in the next repeated operation, and acceleration information not containing lost parts can be obtained as shown in FIG. 6.

As described, the machine system 1 according to the present embodiment has an advantage in that, instead of repeating, when there is a lost part or a so-called omission in acceleration information, the same operation until complete acceleration information is acquired by repeated operations, acceleration information with no lost parts is generated by ending repetition when acceleration information which supplements the lost parts of first acceleration information is acquired, and thus, the acceleration information can be acquired in a short time and with a reduced number of repetitions.

Additionally, in the present embodiment, the transmitting unit 9 sequentially wirelessly transmits, immediately after detection by the acceleration sensor 8, a series of pieces of acceleration information detected by the acceleration sensor 8 during predetermined operations of the robot 2, but instead, the transmission timing may be made different for each repeated operation.

In this case, the transmitting unit 9 may determine whether an operation is the first operation or a repeated operation, and may change the transmission timing for each operation.

With respect to determination of an operation, the transmitting unit 9 may determine a different operation when there is a stop state over a predetermined period of time or longer, or may determine a repeated operation in a case where similar acceleration information is found to exist based on analysis of acceleration information, for example. Furthermore, the teach pendant 6 may include a different transmitting unit 9, and the acceleration sensor 8 may include a different receiving unit 10, and a signal indicating whether an operation is a first operation or a second or later repeated operation may be transmitted from the teach pendant 6 side to the acceleration sensor 8 side each time a repeated operation is performed by the robot 2.

The transmitting unit 9 may sequentially shift the transmission timing by a predetermined delay time in one direction at each repeated operation. The delay time is preferably a time which allows transmission of acceleration information in three directions of X, Y, and Z at one position or longer.

Moreover, also on the receiving unit 10 side, whether acceleration information is acceleration information at the time of a first operation or acceleration information at the time of a repeated operation has to be determined, and in the case of acceleration information at the time of a repeated operation, processing has to be performed after the acceleration information is shifted forward by the delay time such that a position becomes coincident with a corresponding position in the acceleration information at the time of the first operation.

Figure 7:
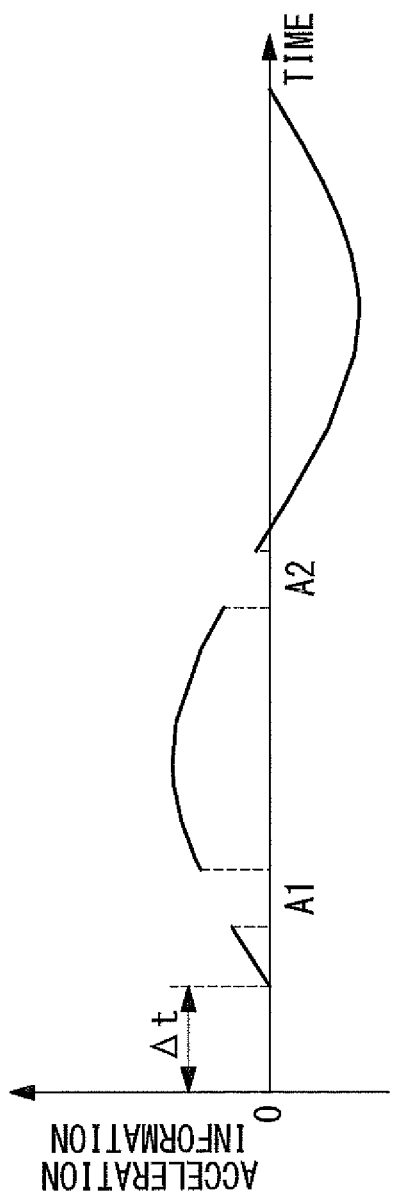
FIG. 7 is a diagram showing an example of acceleration information which is acquired during a repeated operation by a modified example of the machine system in FIG. 1.

For example, in the case where the acceleration information in FIG. 4 is acquired during a first predetermined operation, and the acceleration information in FIG. 7 is acquired during a second predetermined operation, the pieces of acceleration information are shifted from each other by a delay time Δt, and thus, the complementing information determination unit 15 shifts the acceleration information in FIG. 7 forward by the delay time Δt, and then compares the information against the acceleration information in FIG. 4 and determines whether the information contains the lost parts.

In the case where occurrence of a loss in the acceleration information is due to the posture of the robot 2 at the time of wireless transmission, losses occur at the same timings A1, A2 as shown in FIGS. 4 and 7. By shifting the timing of wireless transmission for each operation of the robot 2, the acceleration information which gets lost may be made different, and all the pieces of acceleration information may be acquired by a small number of repetitions, and acceleration information with no losses, as shown in FIG. 6, may be acquired by complementing.

As the method of making the transmission timing different for each operation of the robot 2, a method of first performing transmission at a transmission timing which is delayed by a predetermined period of time and then sequentially shifting the transmission timing forward may be adopted, as an alternative to a method of delaying the transmission timing at each repetition.

Furthermore, the transmission timings may be randomly different from one another.

Furthermore, instead of making timings of wireless transmission by the transmitting unit 9 different, a notification may be issued to a user to change the position of the transmitting unit 9 or the position of the receiving unit 10, in the case where a loss is detected by the loss detection unit 14 in the acceleration information acquired during a first operation of the robot 2, or in the case where it is determined by the complementing information determination unit 15 that not all the lost parts at the time of the first operation are contained in the acceleration information acquired during at least one repeated operation.

In the case where occurrence of a loss in the acceleration information is due to the posture of the robot 2 at the time of wireless transmission, the part of the acceleration information where a loss is present may be made different by a user moving the teach pendant 6 where the receiving unit 10 is installed or changing the position of the transmitting unit 9 attached to the welding gun 4 according to a notification.

A notification for urging a user to move the transmitting unit 9 or the receiving unit 10 may be issued when the repetition count N exceeds a predetermined count Nth. This may prevent endless repetition of a predetermined operation by the robot 2.

Moreover, in the present embodiment, the robot 2 is cited as the machine including the movable part, but this is not restrictive. Furthermore, the acceleration sensor 8 is attached to the welding gun 4, but this is not restrictive, and the acceleration sensor 8 may be attached to any other movable part.

Moreover, the acceleration sensor 8 is cited as a sensor, but instead, at least one of a position sensor, a speed sensor, an acceleration sensor, a gyro sensor, a vision sensor, and an inertial sensor may be used.

From the above-described embodiment, the following invention is derived.

An aspect of the present invention provides a machine system including a machine including a movable part, a control device that controls the machine, a sensor that is attached to the movable part, and that detects information about the movable part during a predetermined operation of the machine by the control device, a transmitting unit that is attached to the movable part, and that is wirelessly transmits, during the predetermined operation, the information detected by the sensor, a receiving unit that is disposed at a position separate from the machine, and that receives the information wirelessly transmitted by the transmitting unit, a storage unit that stores the information received by the receiving unit, a loss detection unit that detects a partial loss in the information received by the receiving unit, an iterative operation command unit that causes, by the control device, the machine to repeat the predetermined operation at least once, in a case where a loss in the information is detected by the loss detection unit, a complementing information determination unit that determines whether or not every lost part of the information detected first is contained in the information detected by the sensor during at least one repeated operation caused by the iterative operation command unit, and an information complementing unit that ends the repeated operation in a case where every lost part is determined by the complementing information determination unit to be contained, and that complements the information detected first with the information detected during the at least one repeated operation.

According to the present aspect, when the sensor is attached to the movable part of the machine and the movable part is caused to perform a predetermined operation by operation of the control device, information about the movable part during the predetermined operation is acquired by the sensor, and is wirelessly transmitted by the transmitting unit during the predetermined operation. The information transmitted by the transmitting unit is received by the receiving unit disposed at a position separate from the machine, and is stored in the storage unit. Wireless transmission of information allows the information about the movable part to be acquired without extending a movable wire from the movable part.

Detection of a partial loss is performed by the loss detection unit for the information received by the receiving unit, and if a lost part is detected, the control device is caused by the iterative operation command unit to cause the machine to repeat the predetermined operation at least once. Then, whether or not every lost part of the information which was detected first is contained in the information detected by the sensor during the repeated operation is determined by the complementing information determination unit, and if not every lost part is contained, the predetermined operation is repeated again.

On the other hand, in the case where every lost part of the information which was detected first is contained in the information detected during the at least one repeated operation, the information complementing unit ends the repeated operation, and the information which was detected first is complemented with the information detected during the repeated operation.

That is, instead of repeating the predetermined operation until complete information with no loss is transmitted in one predetermined operation, the repeated operation is ended at a time point of acquisition of information capable of complementing the first lost part, and thus, complete information about the movable part can be acquired in a short time and by a small number of repetitions even when there is occurrence of omission in information.

Furthermore, in the aspect described above, during each repeated operation, the transmitting unit may transmit the information at a transmission timing different from a transmission timing in a previous operation.

Then, in the case where occurrence of a lost part of the information is due to the position of the movable part during the predetermined operation, the lost part of the information that is received by the receiving unit may be temporally shifted by changing the transmission timing. Information with a lost part at a position different from the lost part of the information which was detected first can thereby be acquired, and complete information about the movable part can be acquired in a short time and by a small number of repetitions.

Moreover, in the aspect described above, during each repeated operation, the transmitting unit may transmit the information at a transmission timing shifted by a predetermined time in one direction from a transmission timing in an immediately preceding operation.

Then, in the case where the repeated operation is performed a plurality of times, the transmission timings are sequentially shifted in one direction, and lost parts caused by the same factor can more reliably be prevented from overlapping each other between pieces of information acquired during different operations.

Moreover, in the aspect described above, there may further be provided a notification unit that issues a notification urging change of an attachment position of the transmitting unit to the movable part or the position of the receiving unit, in a case where the loss is detected by the loss detection unit.

Then, a user may change the attachment position of the transmitting unit or the position of the receiving unit according to the notification, and a transmitting position or a receiving position may be made different for the information detected during the first operation and for the information detected during the repeated operation, and lost parts can be prevented from overlapping each other between pieces of information acquired during different operations.

Moreover, in the aspect described above, the notification unit may issue the notification in a case where the complementing information determination unit determines that not every lost part is contained even after the repeated operation is performed a predetermined number of times.

The number of repetitions of the repeated operation can thereby be restricted.

REFERENCE SIGNS LIST 1 machine system
2 robot (machine)
3 control device
4 welding gun (movable part)
7 operation command unit (iterative operation command unit)
8 acceleration sensor (sensor)
9 transmitting unit
10 receiving unit
11 storage unit
14 loss detection unit
15 complementing information determination unit
16 information complementing unit
17 notification unit

The invention claimed is:

1. A method of acquiring acceleration information of a movable part of a machine system, the method comprising:
   detecting, during a predetermined operation using a sensor attached to the moveable part, the acceleration information relative to the movable part of a machine;
   wirelessly transmitting, during the predetermined operation, the detected acceleration information;
   receiving the wirelessly transmitted acceleration information;
   storing the received acceleration information;
   determining whether the received acceleration information is partially lost;
   responsive to a determination that the received acceleration information is partially lost, repeating the predetermined operation at least once;
   determining, utilizing the acceleration information contained by the sensor attached to the movable part, whether every lost part of the previously received acceleration information is contained in the subsequent acceleration information detected during the at least one repeated operation;
   responsive to a determination that every lost part of the previously received acceleration information is contained in the subsequent acceleration information is contained during the at least one repeated operation, terminating the repeated operation; and
   complementing the received acceleration information with the partially lost acceleration information that was contained in the subsequent acceleration information detected during the at least one repeated operation thereby preventing repeating the predetermined operation until complete acceleration information with no loss is transmitted.

2. The method according to claim 1, comprising:
   transmitting, during each of the at least one repeated operation, the acceleration information at a transmission timing different from a transmission timing in a previous operation.

3. The method according to claim 2, comprising transmitting, during each of the at least one repeated operation, the acceleration information at a transmission timing shifted by a predetermined time in one direction from a transmission timing in an immediately preceding operation.

4. The method according to claim 1, wherein, responsive to the determination that not every lost part is contained after the at least one repeated operation, issuing a notification.

5. The method according to claim 1, wherein the machine comprises a robot.

6. The method according to claim 5, wherein the robot comprises a vertical articulated robot.

7. The method according to claim 6, wherein the movable part comprises a welding gun.

8. The method according to claim 7, wherein the welding gun is provided at a wrist of the robot.

9. The method according to claim 1, wherein the sensor comprises at least one of a position sensor, a speed sensor, an acceleration sensor, a gyro sensor, a vision sensor, and an inertial sensor.

* * * * *